June 1, 1926.                       W. GUY-PELL                    1,586,738
                                  COOKING APPARATUS
                               Filed August 8, 1925          2 Sheets-Sheet 1
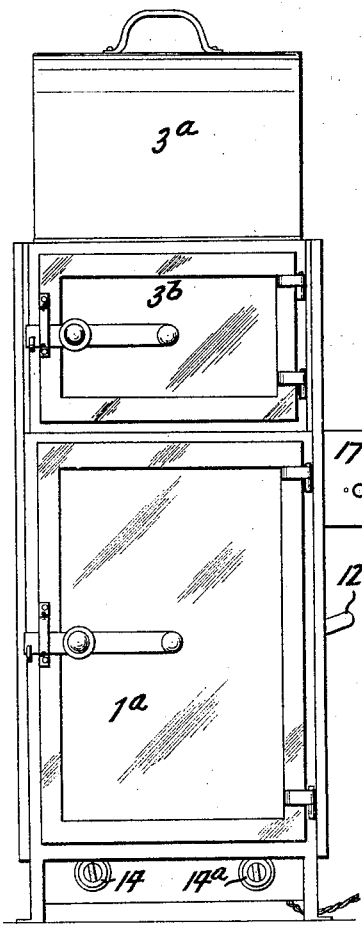
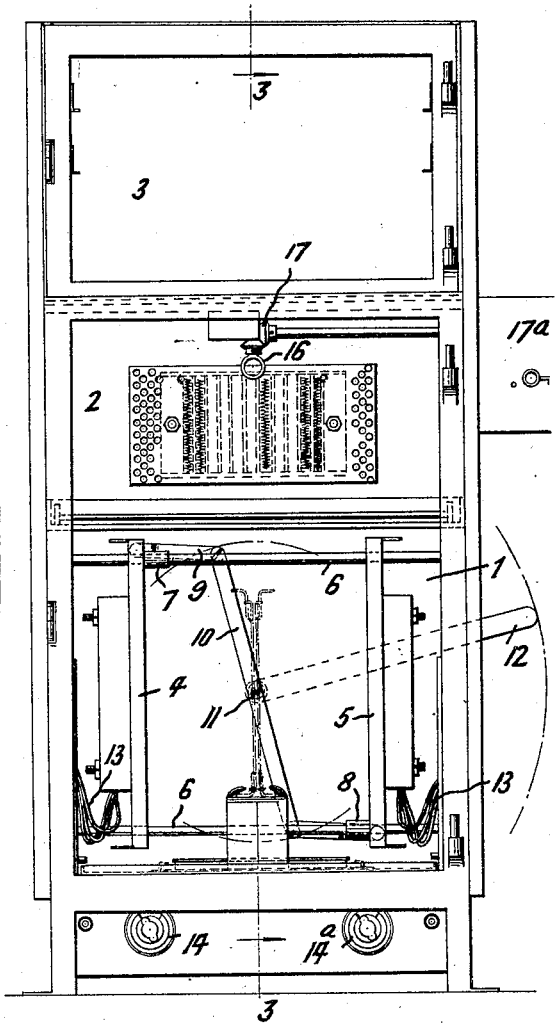
Inventor
William Guy-Pell
By Dowell & Dowell
Attorneys June 1, 1926. 1,586,738
W. GUY-PELL
COOKING APPARATUS
Filed August 8, 1925 2 Sheets-Sheet 2

Inventor
William Guy-Pell
By Dowell & Dowell
Attorneys

Patented June 1, 1926.

1,586,738

UNITED STATES PATENT OFFICE.

WILLIAM GUY-PELL, OF LONDON, ENGLAND.

COOKING APPARATUS.

Application filed August 8, 1925, Serial No. 48,942, and in Great Britain December 9, 1924.

The value of radiant heat for cooking purposes has been long known and it was at one time customary to roast in front of a glowing fire, frequently with the aid of a jack for rotating the joint or the like. The introduction of the close kitchen range in the first place and subsequently of ranges heated by gas etc., resulted in this method being practically abolished, food being now generally roasted in an oven where the heat is not transmitted by radiation but by conduction and convection.

It is true so-called grillers have been proposed making use of vertically arranged and laterally displaced heating elements sometimes mounted on walls of a chamber and capable with the latter of being separated to different extents so as to produce a space of varying size in which the food is suspended or supported so that it is heated simultaneously from opposite sides. Such apparatus, however, as heretofore proposed, has not been in all respects satisfactory.

The object of the present invention, is to provide improved electric cooking apparatus of this type, an important feature being the provision of means whereby, without using screws, the heating elements can be simultaneously adjusted as to position.

Figure 3:
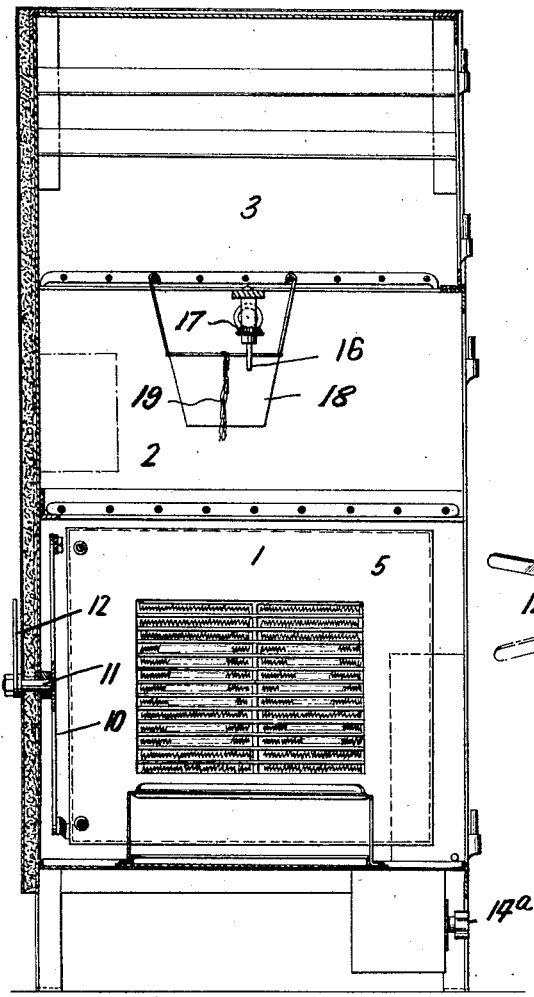
Figure 4:
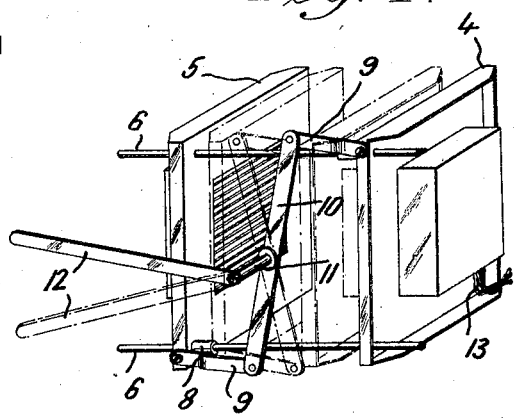

An electric cooking apparatus embodying this and other features which separately form part of a companion application Serial No. 48,941 of even date herewith, is illustrated in the accompanying drawings, Fig. 1 being a front elevation of the complete oven. Fig. 2 is a similar view to a larger scale of said oven but with parts removed. Fig. 3 is a vertical section on the line 3—3, Fig. 2 looking in the direction of the arrows. Fig. 4 is a perspective view of a portion of the interior heating arrangement of the oven.

According to the embodiment illustrated in Figs. 1 to 4 there is provided a lower compartment 1, for roasting or grilling and upper compartments 2, 3 the compartment 2 being say for roasting and baking and the compartment 3 for baking, warming and the like. The top of the compartment 3, may serve as a hot plate and be provided with a bodily removable cover 3ª. The compartments 1 and 2 may have a common door 1ª whilst the compartment 3 has its oven door 3ᵇ. The lower compartment 1 contains two vertical adjustable heating elements 4, 5 between which the food is placed for roasting or grilling. As will be more clearly discernible from Fig. 4 these elements are adapted to slide along stationary guide rods 6, the element 4 having a sleeve 7 engaging the upper rod and the element 5 being provided with a similar sleeve 8 coacting with the lower rod. Simultaneous movement towards or away from one another is imparted to the elements by means of links 9 connected to a swing bar 10, adapted to be rocked about a spindle 11 by a lever 12 at the back of the stove. 13 represents electric leads for the elements 4, 5 each element being separately controllable by a companion switch 14 or 14ª. The food may be either stationary, or it may be rotatable; in the latter case it may be hung from a swivel eye 16, rotated by gearing 17 from a clockwork motor 17ª outside the oven, or otherwise including hand driving. This arrangement leaves the space in the baking compartment 2, which is above, quite free, the clockwork being unexposed to the excessive heat of the roasting chamber 1. A small vessel 18 containing fat for basting the joint, may be arranged above the joint, drip therefrom being shown as regulated by a wick 19 to automatically baste the joint at the desired intervals.

The various compartments may be permanently attached.

In the roasting compartment 1, the elements 4, 5 comprise sheet metal partitions upon which the heating elements proper are fixed, the said partitions being arranged to fit the compartment, so that the heat is confined to the space existing between the two partitions. When the partitions are moved the capacity of the space is adjusted, so that when cooking food of small bulk such as chops, toast etc., less heat is required than would be the case if the whole compartment had to be heated.

The partitions may be lagged, polished or enamelled on one or both sides and they may be provided with a reflector or face of refractory or non-conducting material on the side adjacent to the heating element. The upper compartments may be heated by the hot air or fumes rising from the roasting compartment and passing into them.

The various compartments may be arranged to have the sides easily removable for cleaning and inspection, and the sides, doors etc. may be constructed in the usual way with enamelled metal. They may also be lagged.

The heating elements may conveniently be of one or more of the forms described in the specification of my application for British Letters Patent No. 29,587 of 9th December 1924.

What I claim is:—

1. In apparatus of the kind described, a pair of heating elements, a pair of stationary guides arranged horizontally one above the other in a common vertical plane adjacent to one edge of each heating element and means to produce rapid movement of both heating elements simultaneously applied to one heating element near the lower guide and to the other heating element near the upper guide, substantially as described.

2. In apparatus of the kind described, a pair of heating elements, stationary guides along which the said elements are adapted to slide, a link pivoted to each element, a swing bar to which the links are connected, a spindle to which the swing bar is secured at its centre and means for rotating the spindle, substantially as described.

3. In apparatus of the kind described, a pair of heating elements, stationary guides along which the said elements are adapted to slide, a link pivoted to each element, a swing bar to which the links are connected, a spindle to which the swing bar is secured at its centre and a lever upon the spindle whereby it can be rotated, substantially as described.

4. An electric cooker comprising a chamber, a pair of heating elements, a pair of stationary guides arranged horizontally one above the other in a common vertical plane adjacent to one edge of each heating element and to the rear of the chamber, means to produce rapid movement of both heating elements simultaneously applied to one heating element near the lower guide and to the other heating element near the upper guide said means comprising a link pivoted to each element and a swing bar to which the links are connected, a spindle extending through the rear of the chamber aforesaid, to which the swing bar is connected, and a lever at the outer extremity of the spindle of a length sufficient to enable it to project beyond the side of the cooker for manipulation.

Signed at London England this 24th day of July 1925.

WILLIAM GUY-PELL.